Jan. 19, 1965  J. CUMMING  3,166,183
DISHWASHING MACHINE CONVEYOR
Filed March 5, 1962  2 Sheets-Sheet 1
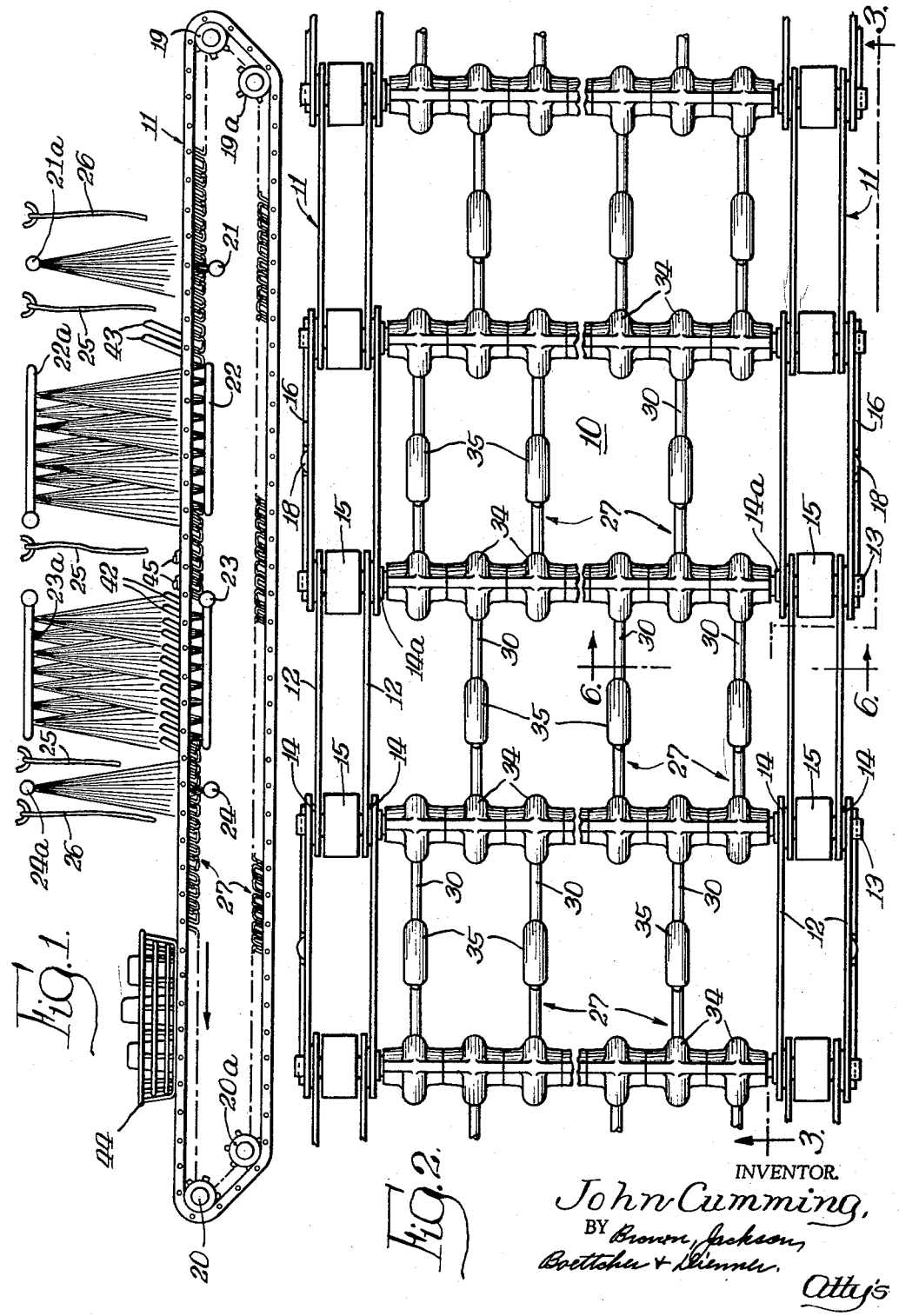
INVENTOR.
John Cumming,
BY Brown, Jackson,
Boettcher & Dienner,
Atty's

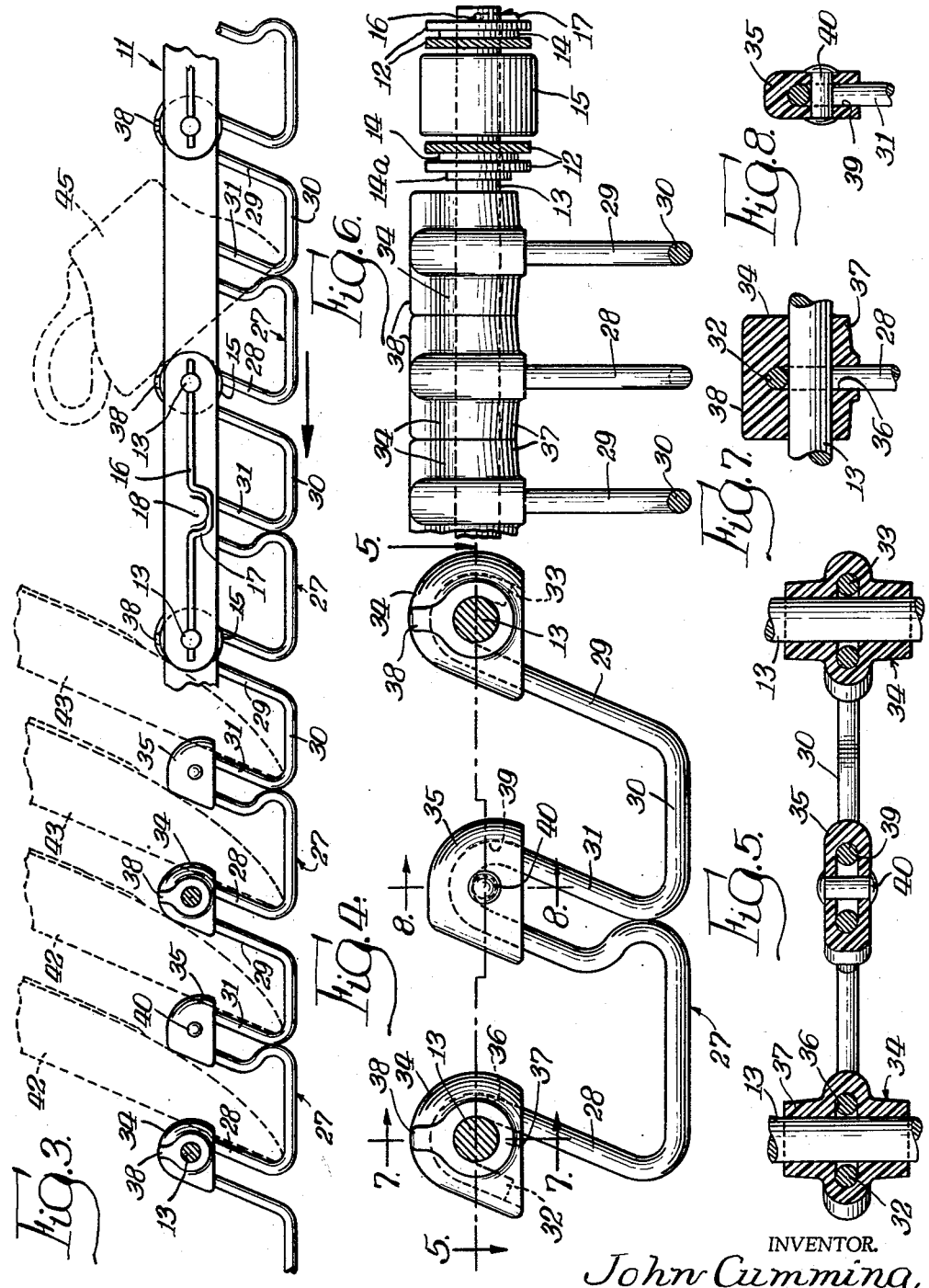

United States Patent Office 3,166,183
Patented Jan. 19, 1965

3,166,183
DISHWASHING MACHINE CONVEYOR
John Cumming, River Forest, Ill., assignor to G. S. Blakeslee & Co., Chicago, Ill., a corporation of Illinois
Filed Mar. 5, 1962, Ser. No. 177,947
3 Claims. (Cl. 198—131)

This invention relates to endless conveyors intended for use in dishwashing machines and for analogous purposes.

In known types of dishwashing machines the dishes and other articles to be washed are transported by means of an endless conveyor and, during their travel through the machine, are subjected to washing and rinsing sprays projected upwardly through the upper run of the conveyor and downward from above the conveyor onto the dishes and other articles. In the known machines referred to the conveyor commonly is provided with elements, frequently termed pegs, which project upwardly from the upper run of the conveyor for supporting thereon dishes and other articles to be washed. Spoons, cutlery, tumblers and other smaller articles commonly are placed in wire trays which are set upon the conveyor so as to be supported by the pegs. That materially increases the distance of such articles above the lower spray means with the result that, in many cases, the articles supported in the basket or tray are not effectively washed due to the fact that the spray from beneath does not impinge upon such articles with appreciable force. The same difficulty is often experienced, though to less extent, with articles supported upon the upper run of the conveyor itself, due to the fact that the sprays from below the upper run are impeded or blocked by the conveyor structure, including the pegs for holding the articles. A further difficulty encountered in the known conveyors mentioned is that in many of such conveyors the means for holding the articles to be washed are entirely formed of metal which often marks the dishes necessitating separate wiping thereof to remove such marks after the dishes have been taken from the machine.

My invention is directed to a conveyor for use in dishwashing machines and the like which avoids the above noted objections to the known type of conveyors. To that end, I provide a conveyor having dish holding means extending between the runs of the conveyor so that the dishes held thereby extend in part below the plane of the upper run of the conveyor and are thus disposed nearer the lower spray means than in the presently known and used type of conveyors. Further, in the conveyor of my invention, the cross rods of the upper run thereof are disposed substantially in a common plane and the upper face of such run is unobstructed, so that trays containing small articles to be washed may readily be slid onto and off of the upper run of the conveyor, the articles in such trays being disposed nearer the lower spray means than is the case where the trays are supported by pegs or fingers projecting above the upper run of the conveyor, above mentioned. A further and important object of my invention is the provision of metal links connecting the cross rods of the conveyor and provided with protective members of relatively soft material which guard against objectionable contact of dishes with metal parts of the conveyor, with possible resultant breakage, while also guarding against objectionable marking of the articles supported by the metal links, with the advantage that wiping of the articles to remove the marks therefrom is not necessary. It also is an important object of my invention to provide means whereby the protective members cooperate with the links and the cross rods for restraining the links and the protective members against displacement while facilitating removal and replacement thereof as may be required. Further objects and advantages of my invention will appear from the detail description.

In the drawings:

FIGURE 1 is a side view, partly broken away, of a conveyor and associated parts embodying my invention, for a dishwashing machine;

FIGURE 2 is a fragmentary plan view, on an enlarged scale and partly broken away, of the upper run of the conveyor of FIGURE 1;

FIGURE 3 is a sectional view taken substantially on line 3—3 of FIGURE 2;

FIGURE 4 is a side view, on an enlarged scale, of one of the body links of the conveyor of FIGURE 1, the cross rods and the protective cap members being shown in section;

FIGURE 5 is a sectional view taken substantially on line 5—5 of FIGURE 4;

FIGURE 6 is a sectional view taken substantially on line 6—6 of FIGURE 2;

FIGURE 7 is a sectional view taken substantially on line 7—7 of FIGURE 4, the cross rod being shown in elevation; and FIGURE 8 is a sectional view taken substantially on line 8—8 of FIGURE 4.

The conveyor comprises an inner or body portion 10 disposed between side drive chains 11 which may be of any suitable construction. As shown, the drive chains 11 are formed of inner and outer pairs of links 12 disposed with their end portions in overlapping relation. Cross rods 13, uniformly spaced lengthwise of the chains 11, project beyond body portion 10 and through the overlapping end portions of the links 12. The links 12 of the inner pairs thereof are spaced from the links of the outer pairs thereof by washers 14 and rollers 15 are appropriately mounted on the rods 13 between the inner links 12. The rods 13 project outwardly beyond the outer links of chains 11 and are provided with diametrical bores which receive the end portions of lock wires 16 each provided at its midportion with a U bend 17 which cooperates with a locking tab 18 struck from the corresponding outer chain link 12 for restraining wire 16 against endwise movement. A snap ring 14a, engaging in a corresponding groove in the cross rod 13, may be provided at the inner face of the inner one of the respective pairs of outer links 12 effective for restraining that link against inward movement along rod 13. The drive chains 11 pass about sprocket wheels 19 and 20 and 19a and 20a, provided with projections or teeth suitably formed and disposed for engaging the rollers 15 for driving and guiding the conveyor. It may be assumed, for purposes of description, that the sprocket wheel 20 is driven counterclockwise, by suitable known means, as viewed in FIGURE 1, advancing the upper run of the conveyor toward the left. In practice, the washing machine is provided with tracks upon which the rollers 15 at the upper run of the conveyor travel for supporting that run in substantially horizontal position, as is known. Lower spray heads 21, 22, 23 and 24 are disposed beneath the upper run of the conveyor, such spray heads being opposed to upper spray heads 21a, 22a, 23a and 24a, respectively. The spray heads 21 and 21a are the pre-wash sprays, the spray heads 22 and 22a are the wash sprays, the spray heads 23 and 23a are the rinse sprays and the spray heads 24 and 24a are the final rinse sprays. The upper spray heads are separated by canvas curtain 25 therebetween, there being canvas curtains 26 adjacent the outer sides of the spray heads 21a and 24a. In practice, the conveyor and spray heads and associated parts are enclosed within a suitable housing including a portion of increased height enclosing the upper spray heads 21a to 24a, inclusive, suitable means being provided for supplying rinse water and washing solution to the spray heads under appropriate pressure, as will be understood.

The body portion 10 of the conveyor comprises a plurality of body links 27 of substantially U-shape extending between and mounted on each two adjacent ones of the cross rods 13. The latter, the links 12 of the side drive chains 11 and the body links 27, preferably are formed of stainless steel, the washers and lock wires and other small parts of the side chains 11 also preferably being formed of stainless steel. The rollers 15 may likewise be formed of stainless steel or of any suitable material.

My instant invention is in the nature of an improvement of the conveyor disclosed in my patent, No. 2,981,401 and has to do with the body links and associated parts of the conveyor. The respective body links 27 are formed of stainless steel wire of suitable gauge. Referring more particularly to FIGURES 4, 5 and 6, each of the links 27 is of substantially U-shape and comprises a leading arm 28 and a following arm 29 joined at their inner ends by a connecting element or bight portion 30 from the center of which projects an outwardly extending finger 31 in the form of a loop formed by bending of element 30 to form such loop. The leading arm 28 is provided at its outer end with an integral downwardly opening loop 32 extending forwardly therefrom. Arm 29 of link 27 is provided at its outer end with a rearwardly extending and downwardly opening loop 33. The openings of the loops 32 and 33 are respectively of a width approximating the diameter of the respective cross rods 13, as shown.

Referring to FIGURE 4 the arms 28 and 29 and finger 31 of the respective links 27 are inclined downward in the direction of travel of the upper run of the conveyor and the height of finger 31 is not greater than the height of arms 28 and 29, respectively, and preferably is of somewhat less height. The finger 31 defines with the arms 28 and 29 two pockets opening at the top run of the conveyor and extending therefrom at an inclination downward in the direction of travel of the conveyor, for reception of articles to be washed.

Referring to FIGURES 4, 5 and 7, the loops 32 and 33 of arms 28 and 29 respectively, of each link 27 are each enclosed by a protective member or cap 34 fitting snugly thereover, and the outer end of finger 31 is likewise enclosed by a protection member or cap 35 fitting snugly thereover. The protective member 34 is provided with an inwardly opening groove 36 conforming to the loop enclosed thereby, the radially outer portion of which groove 36 is curved on a radius the same as that of the wire from which the link 27 is formed, such wire being of circular cross section as shown. The protective member 34 is further provided with a tubular hub 37 extending from each side thereof and, at its top, as viewed in FIGURE 4, with a transverse rib 38 extending to the ends of the hubs 36. The protective member or cap 35 is provided with an inwardly opening groove 39 conforming to the outer end portion of finger 31, the radially outer portion of such groove 39 being curved on a radius the same as that of the wire of link 27. The member 35 is similar to member 34 but without the hubs 36 and the rib 38 of the latter member. The members 34 and 35 may be of any suitable material, but preferably are formed of nylon, by molding.

The interior diameter of the hubs 37 of the member 34 is such as to receive snugly one of the cross rods 13 with the latter spaced inwardly from the surrounding wall of groove 36 a distance the same as the diameter of the wire of loop 32. The member 35 is secured upon the outer end portion of finger 31 by a rivet 40 secured therethrough. The rivet 40 is disposed to contact the inner face of the outer end of finger 31 and, in cooperation with the contiguous straight portions of finger 31 restrains member 35 against turning movement about finger 31, movement of member 35 in either direction lengthwise of finger 31 being prevented by the rivet 40 in cooperation with the outer end of finger 31 and the outer portion of member 35. The protective member 34 on loop 32 is effectively restrained against turning movement by the contiguous straight portions of that loop. It is also restrained against movement in either direction lengthwise of arm 28 by the cross rod 13 in cooperation with the outer end of loop 32 and the outer portion of member 34. In like manner, the member 34 on loop 33 is restrained against turning movement and against movement in either direction lengthwise of arm 29. As shown in FIGURES 3 and 4, the height of finger 31 plus its protective member 35 is within, preferably somewhat less than, the height of either of the arms 28 and 29, plus member 34, of link 27, for a purpose to be explained more fully presently.

The links 27 extend between each two adjacent cross rods 13, with the loops 32 mounted on the leading one of such two cross rods and the loops 33 mounted on the following one of such two cross rods. It will be seen that the links 27 are open at their sides and arranged in rows transversely of the conveyor, with a plurality of links disposed between each two adjacent rods 13, with the leading arms 28 of the links 27 mounted on the leading one of such two cross rods and the following arms 29 of the links mounted on the following one of such two cross rods. As will be clear from FIGURE 2, the hubs 37 of members 34 on the leading arms 28 of each transverse row of links 27 fit between the hubs 37 of the members 34 on the following arms 29 of the next adjacent row of links 27, thereby serving as spacers for the links of the transverse rows thereof. Mounting the links 27 on the cross rods 13 in the manner shown and described, disposes the links so that they extend inwardly of the conveyor, that is, into the space between the upper and the lower runs of the conveyor. As is shown more clearly in FIGURE 3, the links 27 at the upper run of the conveyor extend downwardly therefrom and each link provides two downwardly extending and upwardly opening pockets for reception of dishes, such as plates 42 and platters 43 inserted edgewise into the links. The links 27 are so disposed that the arms 28 and 29, and fingers 31 thereof are inclined, at the upper run of the conveyor, upwardly and away from the direction of travel of that run, indicated by the arrow in FIGURE 3, and the leading surfaces of members 34 and 35 are similarly inclined, effective for retaining the plates and like articles in the links 27. Providing the links 27 with the fingers 31 approximately doubles the capacity of the conveyor compared to a conveyor with similar links without the fingers 31. By having finger 31 of a total height not greater than that of the arms 28 and 29 of link 27 and disposing the links 27 in the manner shown and described, the cross rods 13 at the upper run of the conveyor are disposed substantially in a common horizontal plane and the upper face of such upper run is unobstructed, so that wire trays or baskets, such as the basket 44 shown in FIGURE 1, may be placed upon the upper run of the conveyor for travel therewith. That facilitates the handling of cutlery, tumblers, and smaller articles to be washed and has the further advantage that such articles may be disposed in proximity to the lower spray heads beneath the upper run of the conveyor, so as to be acted upon to best advantage by the sprays. A further advantage of having the links 27 extend downward from the upper run of the conveyor is that the articles supported by the links may be disposed in proximity to the lower spray heads so as to be acted upon to best advantage by the sprays.

The links 27, being formed of stainless steel wire, as noted, are of adequate mechanical strength to support exceptionally heavy loads and resist severe stresses, to which they may be subjected in use. They are also resilient to accommodate passage of the conveyor about the associated drive and guide sprockets and to accommodate expansion and contraction of the conveyor, due to abrupt and substantial variations in temperature in the washing and rinsing operations. The protective members or caps 34 and 35 are formed of relatively soft material, such as nylon, and serve to hold the dishes out of contact with the metal parts of the conveyor, except for slight edge or line contact with the inner portions of links 27 at the upper run of the conveyor. That guards against marks on the dishes such as to require wiping thereof when they have been removed from the machine, and also reduces likelihood of breakage due to contact of the dishes with metal parts of the conveyor. When it is necessary or desired to remove or replace the links 27 or the protective members 34, that may readily be accomplished by removal of the cross rods 13 and replacement thereof, as will be understood from what has been said. The hubs 37 of the protective members 34 are of appreciable length and fit snugly about the cross rods 13 effective, in cooperation therewith, for restraining the links 27 against objectionable sidewise tilting movement. The links 27 are well adapted for receiving flatware, such as plates, platters and the like inserted edgewise therein from above and are also well suited for receiving bowls or cups, such as cup 45, placed therein in inverted position upon the finger 31 of the link 27, so that the cup is thus held at a decided inclination such as to assure drainage therefrom of the washing and rinse solutions or water. The ribs 38 of members 34 have flat outer surfaces of appreciable width and extend outward to at least the outermost elements of the side driving chains 11, that is, at least to the high points of the rollers 15 of those chains, at the upper run of the conveyor, as shown in FIGURE 3.

The ribs 38 of members 34 on each of the cross rods 13 are aligned lengthwise of the latter, i.e., transversely of the conveyor, as shown in FIGURES 2 and 6. The ribs 38 thus provide slideways extending substantially the full width of the upper run of the conveyor, as shown in FIGURE 2, so that trays containing smaller articles to be washed may readily be slid onto and off of the upper run of the conveyor from either side thereof. That facilitates handling of the trays, it being understood that the upper run of the conveyor, at each end thereof, is exposed and readily accessible for that purpose. The ribs 38 extend a material distance outward beyond fingers 31 of links 27 and also function to guard them against being bent or damaged by trays slid onto or off of the upper run of the conveyor.

In the food service equipment industry, the standard height of tables for handling dishes and similar articles is thirty four inches. The upper faces of the ribs, at the exposed end portions of the conveyor of my invention, are disposed at a height of thirty four inches above the floor or supporting surface of the dishwasher. By placing tables of standard height adjacent the sides of the machine, trays containing articles to be washed may readily be slid onto and off of the conveyor without necessity for lifting of the trays. That is advantageous in reducing the physical labor required and is conducive to the handling with expedition and facility of articles to be washed in trays.

The grooves 36 and 39 of the protective members 34 and 35 open inwardly of the conveyor, so that they open downwardly at the upper run thereof, as will be clear from FIGURES 4, 5, 7 and 8. Washing solution and rinse water are sprayed upward under substantial pressure from beneath the upper run of the conveyor, by the spray heads 21, 22, 23 and 24. Some of the upwardly projected liquid sprays are projected into the grooves of members 34 and 35 and effectively wash out any food particles which may have entered such grooves. That effectively guards against accumulation of food particles in the members 34 and 35 thereby assuring that the conveyor is maintained in a clean and sanitary condition, an important consideration in dish washing machines.

As above indicated, it will be understood that changes in detail may be resorted to without departing from the field and scope of my invention, and I intend to include all such variations, as fall within the scope of the appended claims, in this application in which the preferred form only of my invention has been disclosed.

I claim:

1. In an endless conveyor having an upper run and a lower run and intended for use in dish washing machines in which the articles to be washed are subjected to liquid sprays projected upward thereagainst from beneath the upper run of the conveyor, said conveyor comprising side driving chains extending lengthwise of the conveyor path, parallel cross rods connecting said chains and extending transversely of the conveyor path and spaced apart lengthwise thereof, a plurality of links of substantially U-shape lengthwise of the conveyor path disposed between each two adjacent rods and spaced apart transversely of the conveyor path, said links extending inwardly between said runs and respectively comprising a leading arm and a following arm and a connecting element joining the inner ends of said arms, each of said arms of the respective links being provided at its outer end with a loop opening inwardly of the conveyor path, the openings of said loops being of a size to receive said rods to accommodate removal and replacement of said links transversely of said rods, and non-metallic protective cap members provided with grooves opening inwardly of the conveyor path and fitting snugly over and enclosing said loops, one of said two adjacent rods passing snugly through said cap members and loops of the leading arms of said links and the other of said two adjacent rods passing snugly through said cap members and loops of the following arms of said links, said arms and cap members being thereby pivoted on said two adjacent rods, the latter restraining said cap members against movement outwardly of the conveyor path and said cap members in cooperation with said rods restraining said links against movement outwardly of the conveyor path, said links being open and unobstructed at their sides for downward insertion thereinto of dishes from the upper run of said conveyor.

2. In an endless conveyor having an upper run and a lower run and intended for use in dish washing machines in which the articles to be washed are subjected to liquid sprays projected upward thereagainst from beneath the upper run of the conveyor, said conveyor comprising side driving chains extending lengthwise of the conveyor path, parallel cross rods connecting said chains and extending transversely of the conveyor path and spaced apart lengthwise thereof, a plurality of metal wire links of substantially U-shape lengthwise of the conveyor path disposed between each two adjacent rods and spaced apart transversely of the conveyor path, said links extending inwardly between said runs and respectively comprising a leading arm and a following arm and a connecting element joining the inner ends of said arms, each of said arms of the respective links being provided at its outer end with a loop opening inwardly of the conveyor path, the openings of said loops being of a size to receive said rods to accommodate removal and replacement of said links transversely of said rods, and non-metallic protective cap members provided with grooves openings inwardly of the conveyor path and approximately conforming to said loops, said cap members being further provided with tubular hubs extending from the sides thereof, said hubs being of an interior diameter to receive snugly said cross rods and opening into said grooves with the outer portions of the openings of said hubs substantially coincident with the inner surfaces of the outer portions of said loops, one of said two adjacent rods passing snugly through said cap members and loops of the leading arms of said links with said hubs in abutting relation on said one rod and the other of said two adjacent rods passing snugly through said cap members and loops of the following arms of said links with said hubs in abutting relation on said other rod, said arms and cap members being thereby pivoted on said two adjacent rods, the latter restraining said cap members against movement outwardly of the conveyor path and said cap members in cooperation with said rods restraining said links against movement outwardly of the conveyor path, said hub maintaining said links in a substantially parallel spaced relation on said rods, said links being open and unobstructed at their sides for downward insertion thereinto of dishes from the upper run of said conveyor.

3. In an endless conveyor having an upper run and a lower run and intended for use in dish washing machines in which the articles to be washed are subjected to liquid sprays projected upward thereagainst from beneath the upper run of the conveyor, said conveyor comprising side driving chains extending lengthwise of the conveyor path, parallel cross rods connecting said chains and extending transversely of the conveyor path and spaced apart lengthwise thereof, a plurality of metal wire links of substantially U-shape lengthwise of the conveyor path disposed between each two adjacent rods and spaced apart transversely of the conveyor path, said links extending inwardly between said runs and respectively comprising a leading arm and a following arm and a connecting element joining the inner ends of said arms, said connecting element including an outwardly extending loop providing a finger between and of less height than said arms, each of said arms of the respective links being provided at its outer end with a loop opening inwardly of the conveyor path, the openings of said loops being of a size to receive said rods to accommodate removal and replacement of said links transversely of said rods, non-metallic protective cap members mounted on and enclosing the outer end portions of said fingers, and non-metallic protective cap members fitting over and enclosing said loops, one of said two adjacent rods passing snugly through said loop cap members and loops of the leading arms of said links and the other of said two adjacent rods passing snugly through said loop cap members and loops of the following arms of said links, said arms and loop cap members being thereby pivoted on said two adjacent rods, the latter restraining said cap members against movement outwardly of the conveyor path and said loop cap members in cooperation with said rods restraining said links against movement outwardly of the conveyor path, said links being open and unobstructed at their sides for downward insertion thereinto of dishes from the upper run of said conveyor.

References Cited by the Examiner
UNITED STATES PATENTS

| | | | |
|---|---|---|---|
| 2,644,473 | 7/53 | Fox et al. | 134—72 |
| 2,981,401 | 4/61 | Cumming | 198—195 X |
| 3,086,641 | 4/63 | Cumming | 198—134 X |

SAMUEL F. COLEMAN, *Primary Examiner.*

WILLIAM B. LA BORDE, *Examiner.*